Nov. 9, 1926.
H. DUNHAM
ROD CLAMP
Filed Feb. 5, 1926
1,606,615
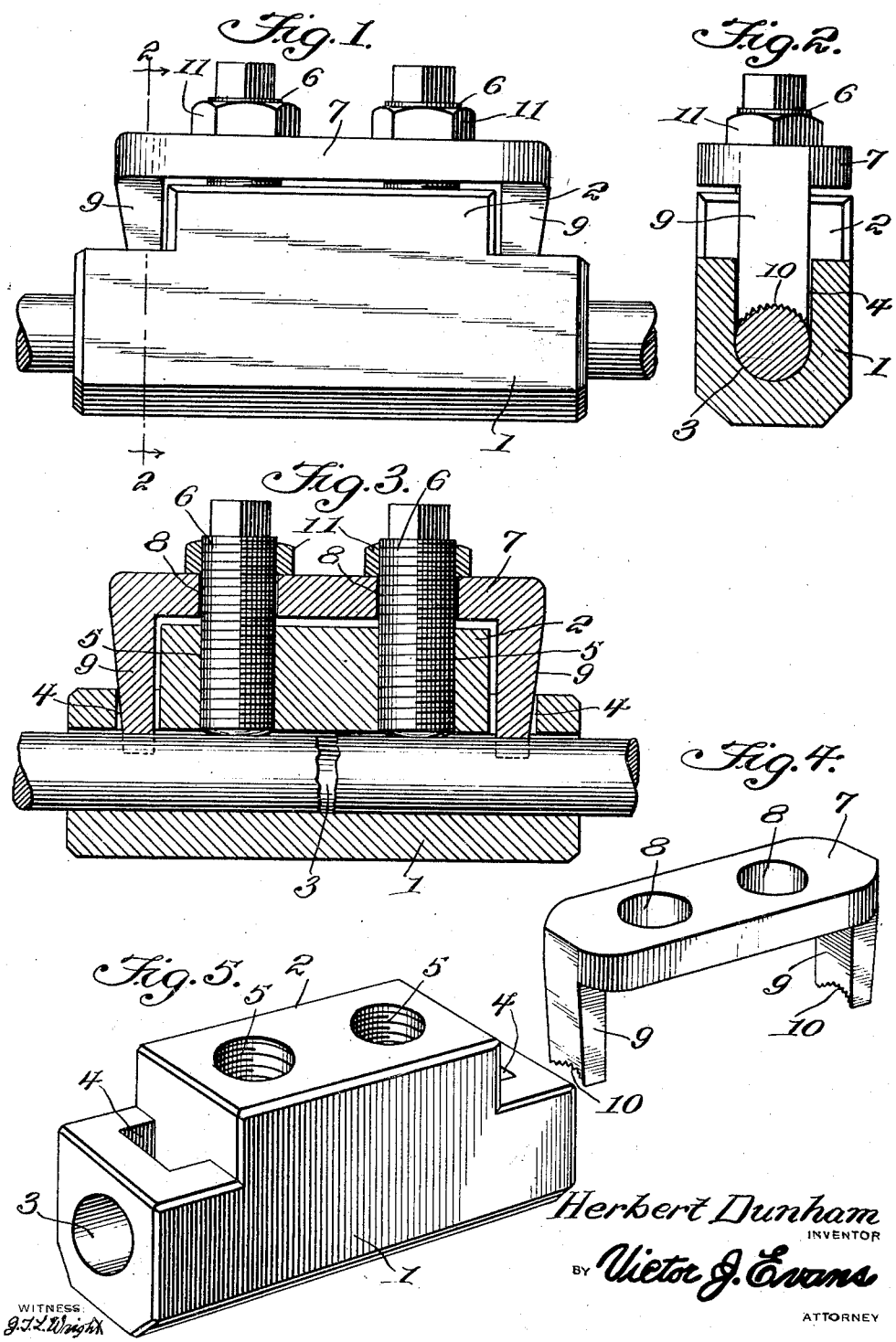

Patented Nov. 9, 1926.

1,606,615

UNITED STATES PATENT OFFICE.

HERBERT DUNHAM, OF FRANKLIN, PENNSYLVANIA.

ROD CLAMP.

Application filed February 5, 1926. Serial No. 86,268.

This invention relates to a clamp, the general object of the invention being to provide means for fastening together the broken parts of a rod or the like.

The invention is mainly designed for use on the pull rods used in the oil fields which frequently break and where it has been necessary to carry the rods to a blacksmith and have heads put on the broken ends to receive the clamps now in use.

With this invention, the necessity for hitting the rods is eliminated and the broken ends can be fastened together in the field and with but little loss of time.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views and in which:—

Figure 1 is an elevation of the improved clamp, showing the same in use.

Figure 2 is a section on line 2—2 of Figure 1.

Figure 3 is a longitudinal sectional view through Figure 1.

Figure 4 is a view of the clamping member.

Figure 5 is a view of the body of the clamp.

In these views, 1 indicates the body of the clamp which is provided with the central extension or enlargement 2 and which has the bore 3 passing longitudinally through its lower part. A hole 4 is formed in the body adjacent each end thereof, with its inner wall in the same plane as the end wall of the extension and these holes communicate with the bore. Threaded holes 5 are formed in the enlargement and communicate with the bore for receiving the bolts 6. A plate 7, having holes 8 therein through which the bolts pass, is provided with the depending end portions 9 which are arranged to pass through the holes 4 to engage the rods, the ends of these pieces 9 being of concaved shape and toothed, as shown at 10.

When a rod breaks, the broken ends are placed in the bore 3, as shown in Figures 1 and 3 and then the bolts 6 are screwed inwardly until their ends engage the rods and thus clamp the rods in the bore. If the bolts are not sufficient to hold the rods in the body, the member 7 can be used, and in this case the member is placed over the bolts with its ends 9 engaging the rods and the toothed portions of said ends 9 are caused to grip the rods by forcing the member downwardly, through means of the nuts 11 on the bolts engaging the part 7. In this case, the broken portions of the rod are engaged by the bolts and by the ends 9 of the member 7 so that the broken ends are firmly held in the clamp.

From the foregoing, it will be seen that I have provided a simple clamp whereby pull rods and the like can be easily and quickly repaired without taking the rods to a blacksmith or the like. This clamp will save considerable time and the drilling outfit is idle but for a few minutes and the parts are so simple that they can be manufactured to sell at low cost.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A clamp of the class described, comprising a body having a longitudinal bore, threaded holes extending at right angles from the bore and communicating therewith, bolts engaging the holes, the body having a hole adjacent each end thereof communicating with the bore, a U-shaped member having its ends entering said holes and shaped to grip the members in the bore, said member having holes therein for fitting over the bolts and nuts on the bolts for forcing the U-shaped member against the members in the bore.

In testimony whereof I affix my signature.

HERBERT DUNHAM.